(12) United States Patent
Kwak et al.

(10) Patent No.: US 11,251,921 B2
(45) Date of Patent: Feb. 15, 2022

(54) METHOD FOR REPORTING CHANNEL STATE IN WIRELESS COMMUNICATION SYSTEM, AND APPARATUS THEREFOR

(71) Applicant: LG Electronics Inc., Seoul (KR)

(72) Inventors: Gyoungil Kwak, Seoul (KR); Yunjung Yi, Seoul (KR); Changhwan Park, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 16/631,924

(22) PCT Filed: Jul. 23, 2018

(86) PCT No.: PCT/KR2018/008300
§ 371 (c)(1),
(2) Date: Jan. 17, 2020

(87) PCT Pub. No.: WO2019/017753
PCT Pub. Date: Jan. 24, 2019

(65) Prior Publication Data
US 2020/0228282 A1 Jul. 16, 2020

Related U.S. Application Data

(60) Provisional application No. 62/535,251, filed on Jul. 21, 2017.

(51) Int. Cl.
*H04L 5/00* (2006.01)
*H04W 24/10* (2009.01)
(Continued)

(52) U.S. Cl.
CPC ........... *H04L 5/0053* (2013.01); *H04W 24/10* (2013.01); *H04W 72/0453* (2013.01); *H04W 24/08* (2013.01)

(58) Field of Classification Search
CPC ... H04L 5/0053; H04L 5/0057; H04L 5/0098; H04L 1/00; H04L 25/0224; H04L 5/0048;
(Continued)

(56) References Cited

U.S. PATENT DOCUMENTS 10,484,126 B2 * 11/2019 Harrison ............... H04L 5/0057
10,925,066 B2 * 2/2021 Davydov ............ H04W 72/048
(Continued)

OTHER PUBLICATIONS

Huawei, HiSilicon, "Overview of wider bandwidth operations", 3GPP TSG RAN WG1 NR Ad Hoc Meeting, Jun. 27-30, 2017, R1-1709972.
(Continued)

*Primary Examiner* — Brian T O Connor
(74) *Attorney, Agent, or Firm* — Dentons US LLP

(57) ABSTRACT

A method for reporting a channel state in a wireless communication system according to an embodiment of the present disclosure, the method being performed by a terminal, and comprising the steps of: the terminal receiving a channel state reporting-related configuration with respect to a plurality of bandwidth parts (BWPs) that are performing BWP adaptation or switching; and reporting channel state information with respect to the plurality of BWPs according to the received configuration, wherein the channel state information with respect to the plurality of BWPs includes channel state information with respect to BWPs that are not activated, the plurality of BWPs include a first BWP and a second BWP of which at least a part is overlapped with the first BWP and which has a smaller size than the first BWP, the size of a sub-band of the first BWP corresponds to a multiple of the size of a sub-band of the second BWP, and the sub-band of the first BWP can completely include the sub-band of the second BWP.

10 Claims, 13 Drawing Sheets

(51) Int. Cl.
*H04W 72/04* (2009.01)
*H04W 24/08* (2009.01)

(58) Field of Classification Search
CPC . H04W 24/10; H04W 72/0453; H04W 24/08; H04B 17/309
See application file for complete search history.

(56) References Cited

U.S. PATENT DOCUMENTS

| | | |
|---|---|---|
| 10,972,238 B2* | 4/2021 | Zhang ............... H04W 72/0446 |
| 2014/0056275 A1 | 2/2014 | Behnamfar et al. |
| 2016/0381674 A1 | 12/2016 | Kim et al. |
| 2018/0338253 A1* | 11/2018 | Nagaraja ............... H04W 24/08 |
| 2019/0364556 A1* | 11/2019 | Davydov ............... H04B 7/088 |
| 2020/0120643 A1* | 4/2020 | Shen ..................... H04L 5/0094 |
| 2020/0228282 A1* | 7/2020 | Kwak ..................... H04L 1/00 |

OTHER PUBLICATIONS

Samsung, "Wider Bandwidth Operations", 3GPP TSG RAN WG1 NR Ad-Hoc#2, Jun. 27-30, 2017, R1-1710761.
Ericsson, "Codeword to layer mapping for DL and UL", 3GPP TSG-RAN WG1 NR Ad-Hoc#2, Jun. 27-30, 2017, R1-1711007.

* cited by examiner

METHOD FOR REPORTING CHANNEL STATE IN WIRELESS COMMUNICATION SYSTEM, AND APPARATUS THEREFOR

This application is a National Stage Entry of International Application No. PCT/KR2018/008300 filed Jul. 23, 2018, which claims the benefit of U.S. Provisional Application No. 62/535,251 filed Jul. 21, 2017, all of which are hereby incorporated by reference in their entirety for all purposes as if fully set forth herein.

TECHNICAL FIELD

The present disclosure relates to a wireless communication system, and more particularly, to a method and apparatus for reporting a channel state.

BACKGROUND ART

The necessity for mobile broadband communication much improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low latency communication (URLLC), etc. has been discussed. In the present disclosure, the corresponding technology is referred to as new RAT for convenience of description.

DISCLOSURE

Technical Problem

An aspect of the present disclosure is to provide a method of reporting a channel state.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of reporting a channel state in a wireless communication system, performed by a user equipment (UE), may include receiving a configuration related to channel state reporting for a plurality of bandwidth parts (BWPs) for which the UE performs BWP adaptation or switching, and reporting channel state information (CSI) for the plurality of BWPs according to the received configuration. The CSI for the plurality of BWPs may include CSI for an inactive BWP. The plurality of BWPs may include a first BWP and a second BWP at least partially overlapped with the first BWP and smaller than the first BWP, a subband size of the first BWP may be a multiple of a subband size of the second BWP, and a subband of the first BWP may fully include a subband of the second BWP.

Additionally or alternatively, CSI for the first BWP may include CSI for the subband of the first BWP overlapped with the second BWP.

Additionally or alternatively, the CSI for the first BWP overlapped with the second BWP may include a difference between the CSI for the subband of the first BWP, overlapped with the subband of the second BWP and CSI for the subband of the second BWP.

Additionally or alternatively, CSI for the first BWP may include CSI for the subband of the first BWP, except for a part overlapped with the second BWP.

Additionally or alternatively, CSI for the first BWP may include CSI for the subband of the second BWP overlapped with the first BWP.

Additionally or alternatively, each of the subband sizes may be a multiple of a resource block group size.

Additionally or alternatively, CSI processes may be configured individually for the first BWP and the second BWP, and a measurement may be performed for the inactive BWP in a measurement gap of a CSI process for an active BWP between the first BWP and the second BWP.

Additionally or alternatively, an integrated CSI process may be configured for the first BWP and the second BWP, and a measurement may be performed for the inactive BWP in a measurement gap of the CSI process.

Additionally or alternatively, a CSI reporting periodicity for an active BWP between the first BWP and the second BWP may be shorter than a CSI reporting periodicity for the inactive BWP.

According to another embodiment of the present disclosure, a UE for performing channel measurement in a wireless communication system may include a transceiver and a processor configured to control the transceiver. The processor may be configured to receive a configuration related to channel state reporting for a plurality of BWPs for which the UE performs BWP adaptation or switching, and report CSI for the plurality of BWPs according to the received configuration. The CSI for the plurality of BWPs may include CSI for an inactive BWP. The plurality of BWPs may include a first BWP and a second BWP at least partially overlapped with the first BWP and smaller than the first BWP, a subband size of the first BWP may be a multiple of a subband size of the second BWP, and a subband of the first BWP may fully include a subband of the second BWP.

Additionally or alternatively, CSI for the first BWP may include CSI for the subband of the first BWP overlapped with the second BWP.

Additionally or alternatively, CSI for the first BWP may include CSI for the subband of the first BWP, except for a part overlapped with the second BWP.

Additionally or alternatively, CSI for the first BWP may include CSI for the subband of the first BWP, except for a part overlapped with the second BWP.

Additionally or alternatively, CSI for the first BWP may include CSI for the subband of the second BWP overlapped with the first BWP.

Additionally or alternatively, CSI for the first BWP may include CSI for the subband of the second BWP overlapped with the first BWP.

Additionally or alternatively, the CSI for the first BWP overlapped with the second BWP may include a difference between the CSI for the subband of the first BWP, overlapped with the subband of the second BWP and CSI for the subband of the second BWP.

Additionally or alternatively, each of the subband sizes may be a multiple of a resource block group size.

Additionally or alternatively, CSI processes may be configured individually for the first BWP and the second BWP, and a measurement may be performed for the inactive BWP in a measurement gap of a CSI process for an active BWP between the first BWP and the second BWP.

Additionally or alternatively, an integrated CSI process may be configured for the first BWP and the second BWP, and a measurement may be performed for the inactive BWP in a measurement gap of the CSI process.

Additionally or alternatively, a CSI reporting periodicity for an active BWP between the first BWP and the second BWP may be shorter than a CSI reporting periodicity for the inactive BWP.

Additionally or alternatively, the UE is a part of an autonomous driving device that communicates with at least one of a network or another autonomous driving vehicle.

The above-described aspects of the present disclosure are merely parts of the embodiments of the present disclosure. It will be understood by those skilled in the art that various embodiments are derived from the following detailed description of the present disclosure without departing from the technical features of the disclosure.

Advantageous Effects

According to the embodiments of the present disclosure, a channel state may be efficiently measured and reported.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
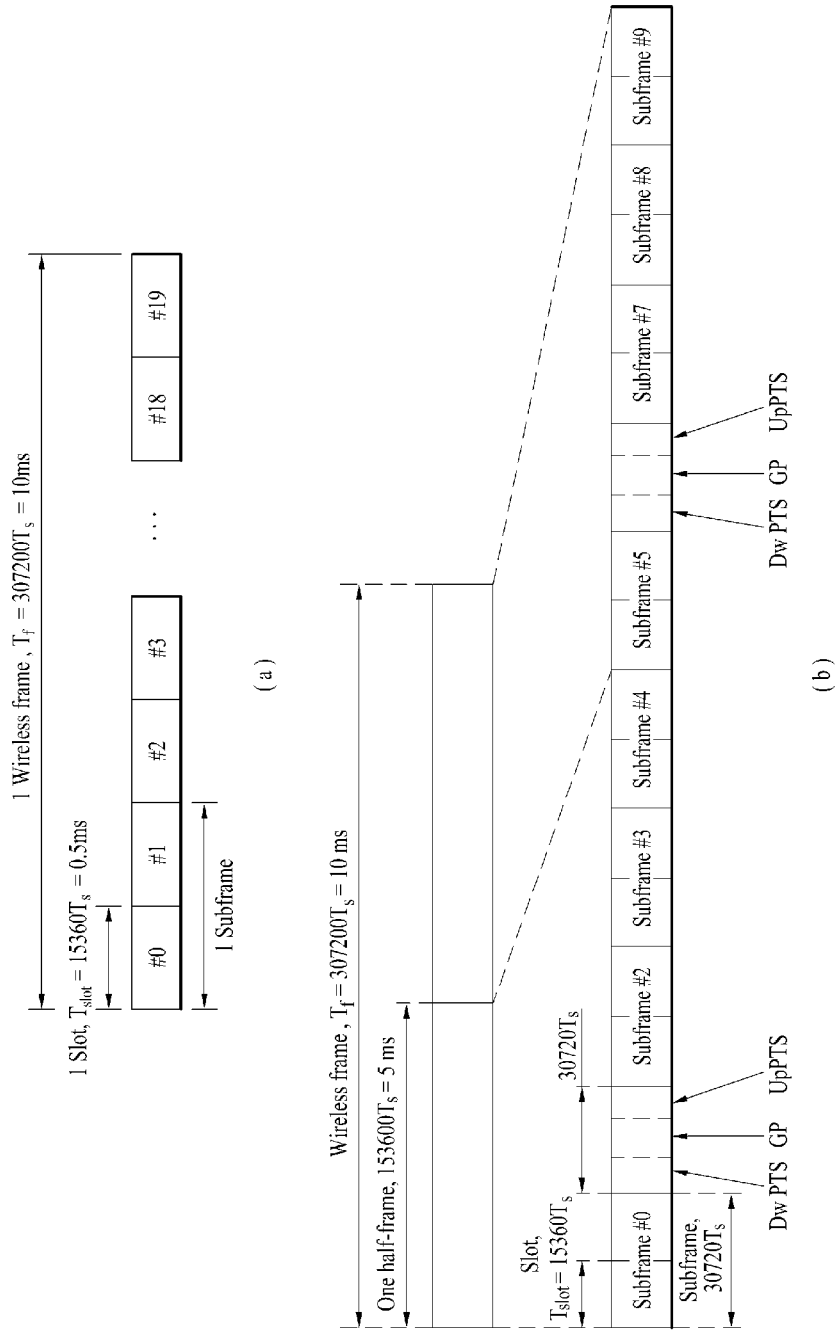
FIG. 1 is a diagram illustrating an exemplary radio frame structure used in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional multiple input multiple output (MIMO) systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink (DL) signal is discriminated from a node transmitting an uplink (UL) signal is called multi-eNB MIMO or coordinated multi-point Tx/Rx (CoMP). Coordinated transmission schemes from among CoMP communication schemes can be categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A DL/UL signal of a specific cell refers to a DL/UL signal from/to an eNB or a node providing communication services to the specific cell. A cell providing UL/DL communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure DL channel state from a specific node using one or more channel state information reference signals (CSI-RSs) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, physical DL control channel (PDCCH)/physical control format indicator channel (PCFICH)/physical hybrid automatic repeat request indicator channel (PHICH)/physical DL shared channel (PDSCH) refer to a set of time-frequency resources or resource elements respectively carrying DL control information (DCI)/control format indicator (CFI)/DL acknowledgement/negative acknowledgement (ACK/NACK)/DL data. In addition, physical UL control channel (PUCCH)/physical UL shared channel (PUSCH)/physical random access channel (PRACH) refer to sets of time-frequency resources or resource elements respectively carrying UL control information (UCI)/UL data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of UL control information/UL data/random access signal through or on PUCCH/PUSCH/PRACH. Furthermore, transmission of PDCCH/PCFICH/PHICH/PDSCH by an eNB is equivalent to transmission of DL data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. DL transmission is discriminated from UL transmission by frequency in FDD mode, and thus the radio frame includes only one of a DL subframe and an UL subframe in a specific frequency band. In TDD mode, DL transmission is discriminated from UL transmission by time, and thus the radio frame includes both a DL subframe and an UL subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes an UL subframe and S denotes a special subframe. The special subframe includes three fields of DL pilot time slot (DwPTS), guard period (GP), and UL pilot time slot (UpPTS). DwPTS is a period reserved for DL transmission and UpPTS is a period reserved for UL transmission. Table 2 shows special subframe configuration.

TABLE 2

| | Normal cyclic prefix in DL | | | Extended cyclic prefix in DL | | |
|---|---|---|---|---|---|---|
| | | UpPTS | | | UpPTS | |
| Special subframe configuration | DwPTS | Normal cyclic prefix in UL | Extended cyclic prefix in UL | DwPTS | Normal cyclic prefix in UL | Extended cyclic prefix in UL |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
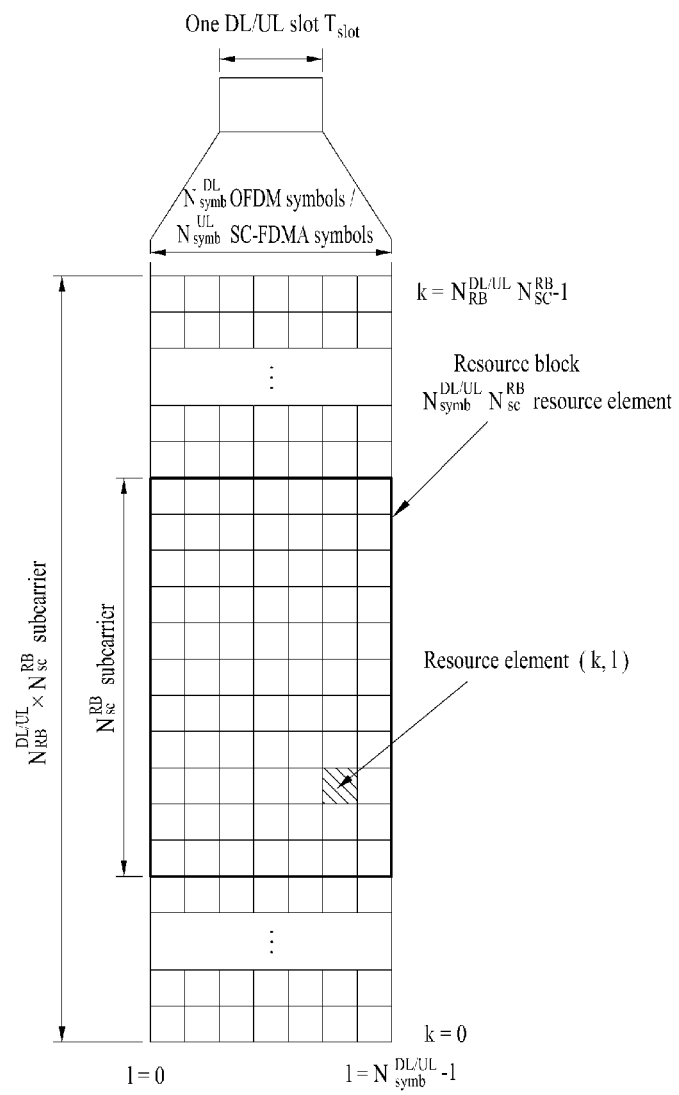
FIG. 2 is a diagram illustrating an exemplary downlink (DL)/uplink (UL) slot structure in a wireless communication system.

FIG. 2 illustrates an exemplary DL/UL slot structure in a wireless communication system. Particularly, FIG. 2 illustrates a resource grid structure in 3GPP LTE/LTE-A. A resource grid is present per antenna port.

Referring to FIG. 2, a slot includes a plurality of orthogonal frequency division multiplexing (OFDM) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a DL slot and $N_{RB}^{UL}$ denotes the number of RBs in an UL slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the DL slot and $N_{symb}^{UL}$ denotes the number of OFDM symbols in the UL slot. In addition, $N_{sc}^{RB}$ denotes the number of subcarriers constructing one RB.

An OFDM symbol may be called an single carrier frequency division multiplexing (SC-FDM) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols.

Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
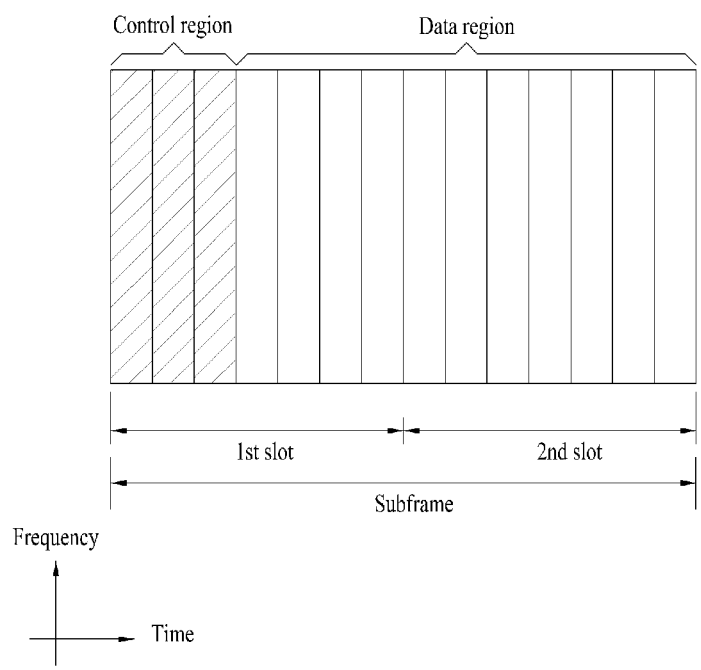
FIG. 3 is a diagram illustrating an exemplary DL subframe structure used in a $3^{rd}$ generation partnership project (3GPP) long term evolution (LTE)/long term evolution-advanced (LTE-A) system.

FIG. 3 illustrates a DL subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a PDSCH is allocated. A resource region available for PDSCH transmission in the DL subframe is referred to as a PDSCH region hereinafter. Examples of DL control channels used in 3GPP LTE include a PCFICH, a PDCCH, a PHICH, etc. The PCFICH is transmitted at a first OFDM symbol of a subframe and carries information regarding the number of OFDM symbols used for transmission of control channels within the subframe. The PHICH is a response of UL transmission and carries an HARQ ACK/NACK signal.

Control information carried on the PDCCH is called DCI. The DCI contains resource allocation information and control information for a UE or a UE group. For example, the DCI includes a transport format and resource allocation information of a DL shared channel (DL-SCH), a transport format and resource allocation information of an UL shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), DL assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for UL and formats 1, 1A, 1B, 1C, 1D, 2, 2A, 2B, 2C, 3 and 3A for DL, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a PDSCH may be allocated to the data region. A PCH and DL-SCH are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is cyclic redundancy check (CRC)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of DL data for a specific UE is called a UE-specific RS. Both or one of DM RS and CRS may be transmitted on DL. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
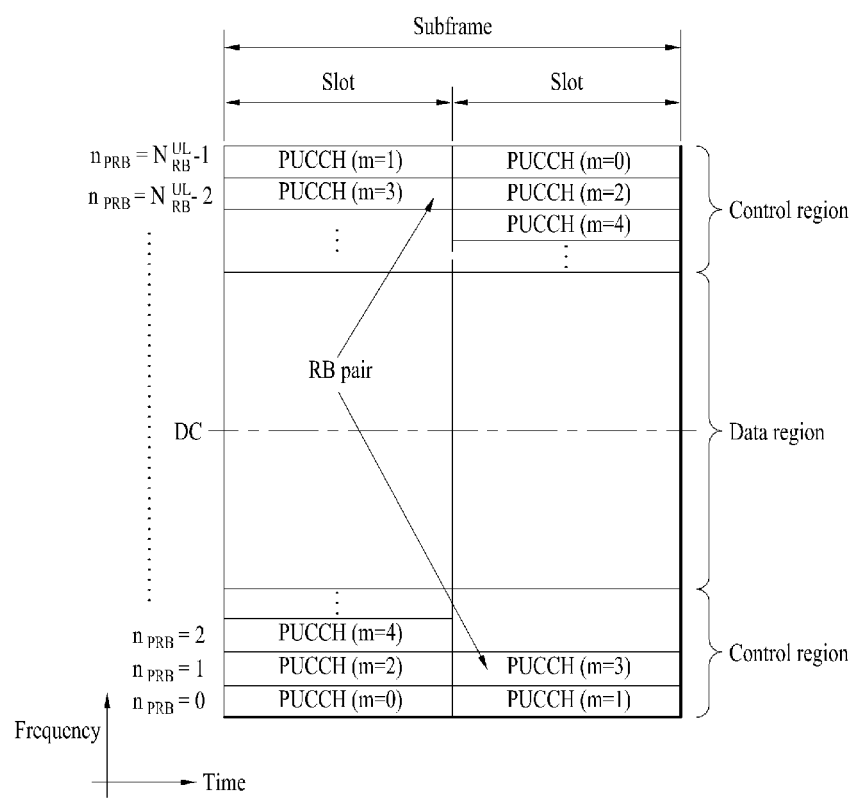
FIG. 4 is a diagram illustrating an exemplary UL subframe structure used in the 3GPP LTE/LTE-A system.

FIG. 4 illustrates an exemplary UL subframe structure used in 3GPP LTE/LTE-A.

Referring to FIG. 4, a UL subframe can be divided into a control region and a data region in the frequency domain. One or more PUCCHs (physical UL control channels) can be allocated to the control region to carry UCI. One or more PUSCHs may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a DL data packet on a PDSCH and indicates whether the DL data packet has been successfully received. A 1-bit ACK/NACK signal is transmitted as a response to a single DL codeword and a 2-bit ACK/NACK signal is transmitted as a response to two DL codewords. HARQ-ACK responses include positive ACK, NACK, discontinuous transmission (DTX) and NACK/DTX. Here, the term HARQ-ACK is used interchangeably with the term HARQ ACK/NACK and ACK/NACK.

Channel State Indicator (CSI): This is feedback information about a DL channel. Feedback information regarding MIMO includes an RI and a PMI.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an UL reference signal and a DL reference signal. In LTE, the UL reference signal includes:

i) a demodulation reference signal (DMRS) for channel estimation for coherent demodulation of information transmitted through a PUSCH and a PUCCH; and ii) a sounding reference signal (SRS) used for an eNB to measure UL channel quality at a frequency of a different network.

The DL reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a DL DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on DL transmission and received by a UE even if the UE does not receive DL data in a specific subframe. This reference signal is used even in a handover situation. The latter is transmitted along with a corresponding resource by an eNB when the eNB transmits a DL signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, an RI, PMI, and a CQI. Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

Meanwhile, in the LTE-A system expected to include finer MU-MIMO and explicit CoMP operations, current CSI feedback is defined in LTE and cannot sufficiently support such operations to be newly employed. As the requirements for CSI feedback accuracy become complicated to obtain sufficient MU-MIMO or CoMP throughput gain, they agreed to configure PMI with two types of long term/wideband PMI ($W_1$) and short term/subband PMI ($W_2$). So to speak, final PMI is expressed as a function of $W_1$ and $W_2$. For example, final PMI W may be defined as follows: $W=W_1*W_2$ or $W=W_2*W_1$. Hence, in LTE-A, CSI shall be configured with RI, $W_1$, $W_2$ and CQI.

In the 3GPP LTE(-A) system, an UL channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a PUCCH. When needed by the scheduler, a PUSCH may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI over the PUSCH after receiving a CSI transmission request control signal (a CSI request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

|  |  | PMI Feedback Type | | |
|---|---|---|---|---|
|  |  | No PMI | Single PMI | Multiple PMIs |
| PUSCH CQI Feedback Type | Wideband (Wideband CQI) |  |  | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |

TABLE 6-continued

| | PMI Feedback Type | | |
|---|---|---|---|
| | No PMI | Single PMI | Multiple PMIs |
| UE selected (Subband CQI) | Mode 2-0<br>RI (only for Open-loop SM)<br>1st wideband CQI(4 bit) + Best-M CQI(2 bit)<br>(Best-M CQI: An average CQI for M SBs selected from among N SBs)<br>Best-M index (L bit) | | Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M PMI(4 bit)<br>(if 8Tx Ant, wideband W2 + Best-M W2 + wideband W1) |
| Higher Layer-configured (Subband CQI) | Mode 3-0<br>RI (only for Open-loop SM)<br>1st wideband CQI(4 bit) + N* subbandCQI(2 bit) | Mode 3-1<br>RI<br>1st wideband CQI(4 bit) + N* subbandCQI(2 bit)<br>2nd wideband CQI(4 bit) + N* subbandCQI(2 bit) if RI > 1<br>Wideband PMI(4 bit)<br>(if 8Tx Ant, wideband W2 + wideband W1) | Mode 3-2<br>RI<br>1st wideband CQI(4 bit) + N* subbandCQI(2 bit)<br>2nd wideband CQI(4 bit) + N*subbandCQI(2 bit) if RI > 1<br>N*Subband PMI(4 bit)<br>(N is the total # of subbands)<br>(if 8Tx Ant, N*subband W2 + wideband W1) |

The transmission modes in Table 6 are selected in a higher layer, and the CQI/PMI/RI are all transmitted in a PUSCH subframe. Hereinafter, UL transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI transmission over PUCCH

The UE may periodically transmit CSI (e.g., CQI/PMI/ precoding type indicator (PTI) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

|  |  | PMI feedback type | |
| --- | --- | --- | --- |
|  |  | No PMI | Single PMI |
| PUCCH CQI feedback type | Wideband (wideband CQI) | Mode 1-0 | Mode 1-1 |
|  | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 7, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

ix) Type 7: the UE transmits a CSI-RS resource indicator (CRI) and an RI.

x) Type 8: the UE transmits a CRI, an RI and a WB PMI.

xi) Type 9: the UE transmits a CRI, an RI and a PTI (precoding type indication).

xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
| --- | --- |
| '00' | Aperiodic CSI reporting is not triggered |
| '01' | Aperiodic CSI reporting is triggered for serving cell |
| '10' | Aperiodic CSI reporting is triggered for a first set of serving cells configured by higher layer |
| '11' | Aperiodic CSI reporting is triggered for a second set of serving cells configured by higher layer |

TABLE 9

| Values of CSI request field | Description |
| --- | --- |
| '00' | Aperiodic CSI reporting is not triggered |
| '01' | Aperiodic CSI reporting is triggered for CSI process set configured for serving cell by higher layer |
| '10' | Aperiodic CSI reporting is triggered for a first set of CSI processes configured by higher layer |
| '11' | Aperiodic CSI reporting is triggered for a second set of CSI processes configured by higher layer |

New Radio Technology (NR)

Now, a description will be given of a new radio access technology (RAT) system. As more and more communication devices demand larger communication capacities, the need for enhanced mobile broadband communication relative to legacy RATs has been pressing. There is also a need for massive machine type communication (MTC) which provides various services anytime, anywhere by connecting multiple devices and things to one another. Furthermore, a communication system reflecting services/UEs sensitive to reliability and latency has been designed.

A new RAT system has been proposed in consideration of enhanced mobile broadband communication, massive MTC, ultra-reliable and low-latency communication (URLLC), and so on. In the present disclosure, this technology is referred to as New RAT or New Radio (NR), for the convenience' sake.

An NR system to which the present disclosure is applicable supports various OFDM numerologies as listed in the following table. A subcarrier spacing (SCS) μ and CP information for each carrier bandwidth part (BWP) may be signaled on DL or UL. For example, an SCS μ and CP information for a DL carrier BWP may be signaled by higher-layer signaling, DL-BWP-mu and DL-MWP-cp. In another example, μ and CP information for a UL carrier BWP may be signaled by higher-layer signaling, UL-BWP-mu and UL-MWP-cp.

TABLE 10

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In NR, a 10-ms frame is configured for DL transmission and UL transmission. The frame may include 10 1-ms subframes. The number of contiguous OFDM symbols per subframe is given by $N_{symb}^{subframe,\mu} = N_{symb}^{slot} N_{slot}^{subframe,\mu}$.

Each frame may include two equal-sized half frames. The half frames may include subframe 0 to subframe 4, and subframe 5 to subframe 9, respectively.

For an SCS $\mu$, slots are numbered with $n_s^\mu \in \{0, \ldots, N_{slot}^{subframe, \mu} -1\}$ in an ascending order in a subframe, and with $n_{s,f}^\mu \in \{0, \ldots, N_{slot}^{frame, \mu} -1\}$ in an ascending order in a frame. The number $N_{symb}^{slot}$ of contiguous OFDM symbols in one slot may be determined as listed in the following table. The starting slot $n_s^\mu$ of a subframe is aligned in the time domain with the starting OFDM symbol $n_s^\mu N_{symb}^{slot}$ of the subframe. Table 4 below lists the numbers of OFDM symbols per slot/per frame/per subframe in a normal CP case, and Table 5 below lists the numbers of OFDM symbols per slot/per frame/per subframe in an extended CP case.

TABLE 11

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 12

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

The NR system to which the present disclosure is applicable may adopt a self-contained slot structure.

Figure 5:
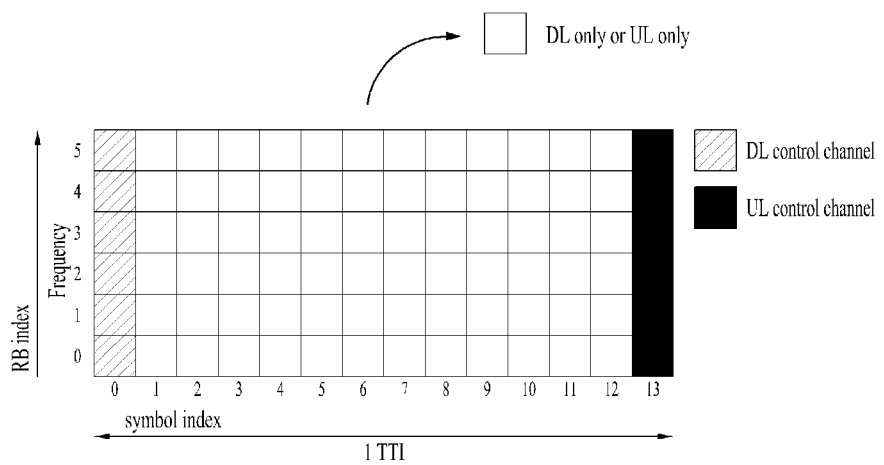
FIG. 5 is a diagram referred to for describing a self-contained structure in a new radio access technology (NR) system.

FIG. 5 is a diagram illustrating a self-contained slot structure applicable to the present disclosure.

In FIG. 5, the slashed area (e.g., symbol index=0) represents a DL control region, and the black area (e.g., symbol index=13) represents a UL control region. The remaining area (e.g., symbol index=1 to 12) may be used for DL or UL data transmission.

According to this structure, a BS and a UE may sequentially perform DL transmission and UL transmission in one slot. Further, the BS and the UE may transmit and receive DL data and a UL ACK/NACK for the DL data in the slot. When an error occurs during a data transmission, this structure may reduce a time taken for a data retransmission and thus minimize the latency of a final data transmission.

In this self-contained slot structure, there is a need for a time gap of a predetermined length for Tx-to-Rx or Rx-to-Tx switching of the BS and the UE. For this purpose, some OFDM symbol at the time of DL-to-UL switching may be configured as a guard period (GP) in the self-contained slot structure.

While the self-contained slot structure has been described above as including both of the DL control region and the UL control region, the control regions may be selectively included in the self-contained slot structure. In other words, the self-contained slot structure according to the present disclosure may include only the DL control region or the UL control region as well as both of the DL and UL control regions.

For example, a slot may be configured in various slot formats. In each slot, an OFDM symbol may be classified as DL (denoted by 'D'), flexible (denoted by 'X'), or UL (denoted by 'U').

Accordingly, the UE may assume that a DL transmission takes place only in 'D' and 'X' symbols. Likewise, the UE may assume that a UL transmission takes place only in 'U' and 'X' symbols.

Now, analog beamforming will be described.

In a millimeter wave (mmW), a wavelength is short, which enables installation of multiple antenna elements over the same area. That is, a total of 100 antenna elements may be installed in a two-dimensional array on a 5*5 cm panel at intervals of 0.5 lambda (wavelength) in a 30 GHz band with a wavelength of 1 cm. In mmW, therefore, coverage may be enhanced or throughput may be increased, by increasing a beamforming gain using multiple antenna elements in mmW.

Each antenna element may include a transceiver unit (TXRU) to enable transmission power control and phase control on an antenna element basis. Thus, each antenna element may perform independent beamforming in each frequency resource.

However, installation of TXRUs for all of about 100 antenna elements is not viable in terms of cost effectiveness. Accordingly, a method of mapping multiple antenna elements to one TXRU and controlling the direction of a beam by an analog phase shifter is under consideration. Because only one beam direction is generated across a total band, frequency selective beamforming is difficult in analog beamforming.

As a solution to the above problem, an intermediate scheme between digital beamforming and analog beamforming, hybrid beamforming may be considered, in which there are B TXRUs fewer than Q antenna elements. The number of the directions of beams which may be simultaneously transmitted is limited to B or less in hybrid beamforming, although the number of the directions of beams varies depending on how the B TXRUs are connected to the Q antenna elements.

Figure 6:
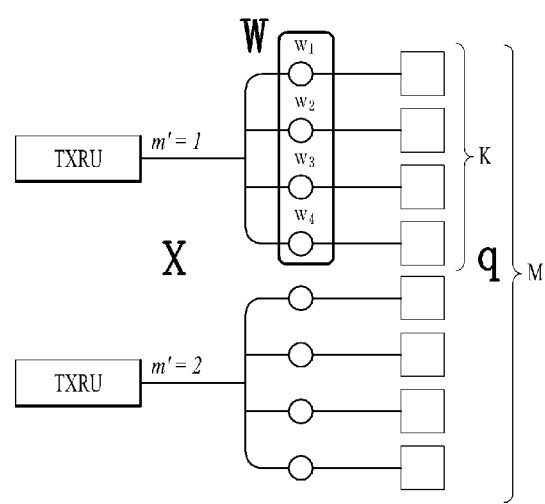
FIGS. 6 and 7 are diagrams referred to for describing schemes of connecting transceiver units (TXRUs) to antenna elements.
Figure 7:
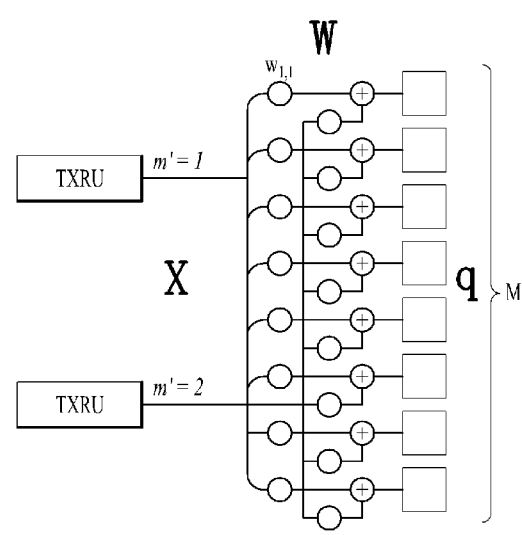

FIGS. 6 and 7 are diagrams illustrating representative methods of connecting TXRUs to antenna elements. The TXRU virtualization model represents the relationship between TXRU output signals and antenna element output signals.

FIG. 6 illustrates a method of connecting TXRUs to sub-arrays. In FIG. 6, one antenna element is connected only to one TXRU.

Figure 8:
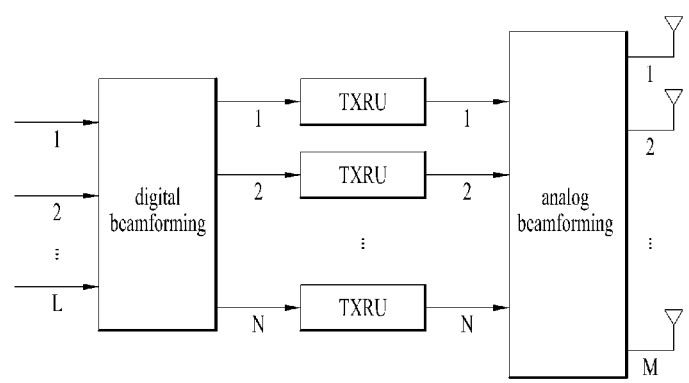
FIG. 8 is a diagram referred to for describing hybrid beamforming.

In contrast, FIG. 7 illustrates a method of connecting each TXRU to all antenna elements. In FIG. 7, each antenna element is connected to all TXRUs. To enable connection between each antenna element and all TXRUs, adders are additionally required, as illustrated in FIG. 8.

In FIGS. 6 and 7, W represents a phase vector weighted by an analog phase shifter. That is, W is a major parameter determining the direction of analog beamforming. In this case, CSI-RS antenna ports and TXRUs may be mapped in a one-to-one or one-to-many correspondence.

Despite difficult beamforming focusing, the configuration illustrated in FIG. 6 offers the benefit that an overall antenna configuration costs low.

On the contrary, the configuration illustrated in FIG. 7 advantageously facilitates beamforming focusing. However, because each TXRU is connected to all antenna elements, overall cost increases.

When a plurality of antennas is used in the NR system to which the present disclosure is applicable, hybrid beamforming with digital beamforming and analog beamforming in combination may be applied. Analog beamforming (or radio frequency (RF) beamforming) means an operation of performing precoding (or combining) at an RF end. In hybrid beamforming, each of a baseband end and an RF end perform precoding (or combining). Therefore, hybrid beamforming may advantageously achieve performance close to that of digital beamforming, with a smaller number of RF chains and a smaller number of digital-to-analog (D/A) (or analog-to-digital (A/D)) converters.

For the convenience of description, a hybrid beamforming structure may be represented by N TXRUs and M physical antennas. Digital beamforming for L data layers to be transmitted by a transmitter may be expressed as an N*L (N-by-L) matrix. Then, N converted digital signals are converted to analog signals via the TXRUs and then subjected to analog beamforming expressed as an M*N (M-by-N) matrix.

FIG. 8 is a diagram illustrating a simplified hybrid beamforming structure from the perspective of TXRUs and physical antennas. In FIG. 8, the number of digital beams is L and the number analog beams is N.

Additionally in the NR system, a method of designing a BS to change analog beamforming at a symbol level and thus support more efficient beamforming for a UE located in a specific area is under consideration. Furthermore, when N specific TXRUs and M RF antennas are defined as one antenna panel as illustrated in FIG. 8, the introduction of a plurality of antenna panels to which independent hybrid beamforming is applicable is under consideration in the NR system according to the present disclosure.

When the BS uses a plurality of analog beams as described above, different analog beams may be suitable for signal reception at different UEs. Therefore, in the NR system to which the present disclosure is applicable, a beam sweeping operation is considered, in which the BS transmits a signal (at least a synchronization signal, system information, paging, or the like) by applying a different analog beam to each symbol in as specific subframe (SF) so that all UEs may have reception opportunities.

The present disclosure proposes a CSI measurement/feedback operation and a subband configuration method, when BWP adaptation or dynamic switching occurs. When BWP adaptation or switching occurs dynamically, a fast CSI measurement/feedback operation with reduced overhead may be required. While the proposal of the present disclosure is described mainly in the context of an LTE-A/shortened transmission time interval (sTTI)/NR/URLLC environment, the proposal may also be extended to different requirements (e.g., in latency and/or reliability).

CSI Measurement for Different BWPs in Case of Dynamic BWP Adaptation or Switching When a specific BWP is activated for a UE, measurement information about other BWPs may be required for BWP adaptation. Measuring CSI after an active BWP is configured through BWP adaptation may cause a problem in terms of latency. Accordingly, the present disclosure proposes CSI measurement operations based on a UE assumption or BS configuration for an active BWP in dynamic BWP adaptation or switching. As such, CSI measurement in multiple BWPs enable a fast feedback, when the feedback is triggered.

(Option 1) Dynamic CSI measurement in active and/or inactive BWP

It is assumed that a current active BWP is BWP A and a target BWP for BWP adaptation or switching is BWP B. The relationship that BWP A>BWP B, BWP A<BWP B, or BWP A=BWP B may be established between BWP A and BWP B according to a BWP adaptation or switching configuration. Further, BWP A and BWP B may overlap fully or partially with each other or may be apart from each other in the frequency domain by a predetermined spacing without overlap. While the present proposal is described in the context of two BWPs, BWP A and BWP B, the same thing may apply to three or more BWPs according to a BS configuration and/or a UE capability.

A BS may transmit CSI-RSs in BWP A and BWP B periodically/semi-persistently/aperiodically (CSI-RS configurations such as periodicities, bandwidths, and frequency positions may be configured separately for the two CSI-RS transmissions), and the UE may periodically/semi-persistently/aperiodically measure wideband CSI and/or subband CSI in BWP A and BWP B and report the measured wideband CSI and/or subband CSI (measurement periodicities, subband sizes, and configurations may be configured separately for the two BWPs).

Further, the size or position of a subband to be measured may be different according to a measurement period. Specifically, when wideband CSI and/or subband CSI is periodically/semi-persistently measured in each BWP, (1) the UE may measurement a subband of a different size in each period. (2) The UE may measure a subband at a different position in each period. The resulting overhead may be decreased from overhead caused by measuring all subbands of each BWP in one time occasion. In this case, there may be a need for measuring at least wideband CSI in each BWP.

In this case, the UE may receive a configured CSI-RS in the following methods.

(Approach 1) The UE may assume that a CSI process is configured for each configured BWP, and a CSI-RS transmission parameter, a CSI reporting period, and a CSI-RS configuration may be configured on a CSI process basis. For example, when different numerologies are used in different BWPs, a CSI process may be operated separately for each numerology. For each UE, a capability for the number of CSI processes supported in one carrier by the UE may be considered. When the UE is configured with more BWPs than its capability, BWPs may be configured according to the UE capability. When the UE is configured with multiple carriers, the total number of supported CSI processes may be shared for multiple BWPs in the multiple carriers. In this method, the UE may consider the following cases, each time a configured CSI-RS is transmitted.

(Case 1) The UE may assume that a BWP associated with a corresponding CSI-RS transmission is activated. In this case, the UE may assume that data/a control signal is received in the activated BWP. That is, the BS measures an RS, assuming that the RS is transmitted only in an activated BWP, for CSI feedback.

(Case 2) A measurement gap is configured in a CSI process for the current active BWP, BWP A, and the UE assumes that a CSI-RS configured in a CSI process for BWP B is measured in the measurement gap. In this case, the UE assumes that data/a control signal is still received in the active BWP, but not during the period of the measurement gap.

(Case 3) When a bandwidth carrying a CSI-RS includes all or a part of the current active BWP, the CSI-RS is measured, while the current active BWP is maintained. Otherwise, Case 2 is assumed. That is, the UE may measure a CSI-RS configured in the CSI-RS process of the inactive BWP in a part overlapped with the active BWP, and measure a CSI-RS in the measurement gap described in Case 2 in a part non-overlapped with the active BWP.

Case 1 or Case 2 may be configured by the BS.

Case 1 or Case 2 may be applied according to the transmission duration of a CSI-RS and a BWP adaptation latency. For example, when the transmission duration is larger than one slot or the BWP adaptation latency is so large that the measurement delay should be larger than one slot, Case 1 is assumed, and otherwise, Case 2 is assumed.

Case 1 or Case 2 may be applied according to the transmission position of a CSI-RS and a control monitoring interval. When the UE is subjected to slot-based scheduling, the UE may assume Case 2, whereas when the UE supports mini slots, the UE may assume Case 1.

Figure 9:
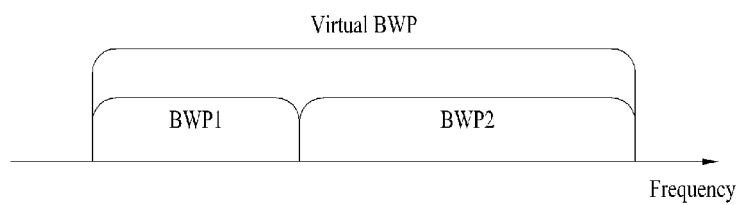
FIG. 9 is a diagram illustrating a virtual bandwidth part (BWP)

(Approach 2) A virtual BWP may be configured with the union of BWPs configured in one CSI process, a configuration for a CSI-RS transmission in the virtual BWP may be received, and a CSI-RS may be measured according to the configuration. FIG. 9 illustrates a virtual BWP including two BWPs. For example, when BWP1=PRB 20 to PRB 40 and BWP2=PRB 40 to PRB 100, the virtual BWP includes PRB 20 to PRB 100, and a CSI transmission periodicity, parameter, and configuration for the virtual BWP may be configured. The UE may measure a corresponding CSI-RS and report CSI only for the entire virtual BWP, a current active BWP, or an indicated BWP. In this method, it may be consumed that the subbands of the virtual BWP are of the same size. The subband size may be configured by higher-layer signaling or may be determined to be a subband size proposed in "Subband Formation" which will be described later (e.g., a nested structure). This method may be useful in measuring a CSI-RS, particularly during beam management for which multiple beams should be measured. Approach 1 and Approach 2 may be used selectively, and a CSI process of another Approach 1 and a CSI process of Approach 2 may exist individually at the same time. When Approach 2 is used, the UE may take an assumption for an active BWP in the following methods.

(Case 1) A measurement gap is configured, and the UE assumes that a configured CSI-RS is measured in an entire virtual BWP during the period of the measurement gap.

(Case 2) When a virtual BWP includes an active BWP, the UE measures a CSI-RS in the virtual BWP, while maintaining the current active BWP. Otherwise, the UE assumes Case 1.

Case 1 or Case 2 may be configured by the BS.

In another example, when a plurality of BWPs are configured, CSI may be measured periodically in the BWPs. When multiple BWPs are configured by the RRC, a CSI-RS is transmitted periodically or semi-persistently in each of the BWPs, and the UE uses the CSI-RS in periodic measurement. When BWP adaptation or switching occurs, the UE may fast feedback CSI for a changed BWP based on the periodic measurements. For simplicity, at least a wideband operation may be assumed for CSI measurement in each BWP. According to a configuration, a wideband CSI operation and/or a subband CSI operation may be performed. For example, when four BWPs are configured, the BS may transmit CSI-RSs in the four BWPs in a certain order to the UE. The four CSI-RSs may have the same or different periodicities/offsets, and may be located in the same or different RE positions. CSI measurement of multiple BWPs may be performed in a single CSI process or two or more CSI processes. In other words, each CSI process may have a CSI configuration for one or more BWPs.

(Option 2) A CSI-RS transmission is preconfigured before BWP adaptation or switching.

Let an active BWP be denoted by BWP A and a target BWP for BWP adaptation or switching be denoted by BWP B. Then, the UE may assume only a CSI-RS transmission in BWP A until before receiving a CSI configuration for a target BWP for BWP adaptation or switching, BWP B from the BS. After receiving a DL grant including a CSI configuration for BWP B and/or an activation field for BWP B, the UE performs BWP activation and/or CSI measurement for BWP B according to the DL grant and/or configuration.

CSI Reporting for Different BWPs in Case of Dynamic BWP Adaptation or Switching

In a dynamic BWP adaptation or switching environment, the UE may report a CSI measurement in the following methods.

(Option 1) The UE may perform reporting for each CSI process periodically/semi-persistently.

Periodic CSI reporting

Feedbacks for BWPs have the same periodicity, and transmitted alternately according to the periodicity.

Alternatively, a feedback for each BWP is transmitted with the same periodicity and a different offset.

Alternatively, a different P-CSI feedback periodicity may be set for each BWP. For example, a feedback is transmitted more often for an active BWP, whereas a long feedback periodicity is set for an inactive BWP. For this purpose, the following collision handling may be required.

1. The UE may feed back full CSI for a current active BWP, dropping CSI for an inactive BWP.

2. Alternatively, the UE may feedback CSI for a current active BWP, dropping only part of CSI for an inactive BWP.

3. The UE may feedback part of CSI for an active BWP and part of CSI for an inactive BWP.

Semi-persistent CSI reporting

Aside from activation/release of a feedback with the same or different periodicity for each BWP, the above-proposed periodic CSI reporting may be performed in the same manner In periodic/semi-persistent CSI reporting, the UE may report CSI for a different subband position with the best channel quality in each period, based on the periodic measurement result of each BWP.

(Option 2) In BWP adaptation or switching, the UE may feed back a periodically performed CSI measurement, upon triggering or at a predefined timing. Therefore, a fast CSI feedback is possible.

Aperiodic CSI feedback triggered by DL assignment: an aperiodic CSI feedback may be transmitted to the BS, simultaneously with or separately from an A/N for DCI indicating BWP adaptation or switching. More specifically, a BWP to be adapted or switched to may be activated for the UE by a DL grant. Then, the UE may assume that an aperiodic CSI feedback is triggered for the BWP by the DL grant or may receive an explicit indication for the aperiodic CSI feedback by a separate field in the DL grant. The CSI feedback may be transmitted based on a CSI-RS transmitted in a subframe/slot in which the DCI (DL grant) has been received, at a predefined timing, or at an explicitly indicated timing.

CSI Feedback Mode for CSI Measurement/Feedback Overhead Reduction in Case of Dynamic BWP Adaptation or Switching It is assumed that BWPs before and after BWP adaptation or switching are a small BWP and a large BWP, respectively. While the present proposal is described in the context of BWP adaptation or switching from a small BWP to a large BWP, the proposal may also be applied to BWP adaptation or switching from a large BWP to a small BWP. Due to dynamic BWP switching, wideband/subband CSI measurement and feedback need to be performed for each of the small and large BWPs. When CSI is measured and fed back each time a BWP is switched, huge overhead may occur.

Hence, the following CSI feedback modes may be considered to reduce measurement/feedback overhead.

Figure 10:
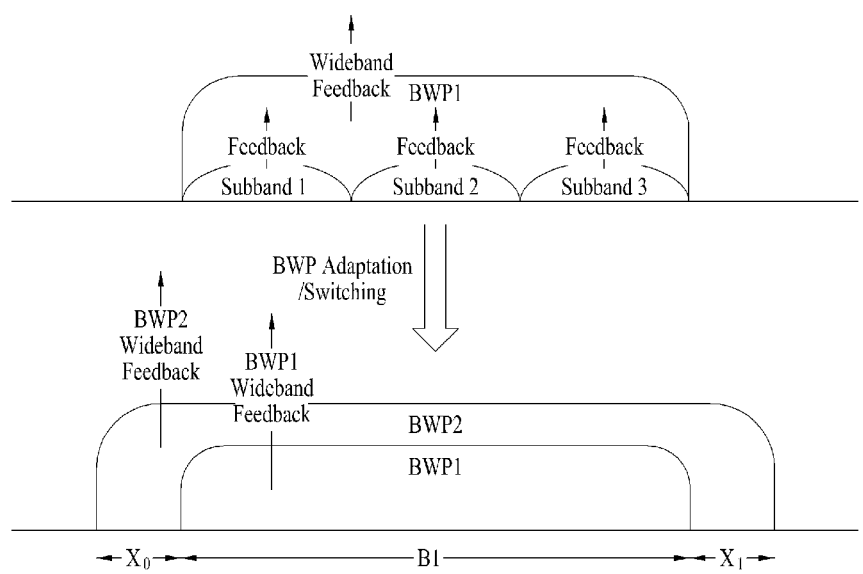
FIG. 10 is a diagram illustrating channel state reporting before and after BWP adaptation or switching.

(Option 1) Wideband CQI/PMI only feedback for both of small BWP and large BWP: the UE may be configured to feed back a wideband CQI/PMI for each BWP before and after BWP adaptation or switching. In consideration of dynamic BWP adaptation or feedback, the UE may report a large-BWP wideband CQI only for a part except for the small BWP during measurement/feedback. As illustrated in FIG. 10, for example, after BWP adaptation or switching, the UE may perform wideband CQI measurement/feedback for BWP1, and feed back a combination of the result of BWP1 and measurements in areas $X_0$ and $X_1$ except for BWP1 as a wideband CQI for BWP2. That is, for the feedback for BWP2, a measurement in an area (i.e., B1) overlapped between BWP1 and BWP2 may be skipped.

(Option 2) The UE may feedback at least a wideband CQI/PMI for an active BWP to reduce measurement/feedback overhead.

(Option 3) Wideband and/or subband CQI feedback for both small and large BWPs: to reduce the measurement/feedback overhead of the large BWP, it is necessary to increase the subband size of the large BWP. A subband format as proposed in the following "Subband Formation" may be considered for a subband configuration.

Alternatively, the BS may indicate a BWP for which a wideband and/or subband CQI/PMI is to be fed back before and after dynamic BWP adaptation or switching. In a specific example, when each of the BWPs before and after dynamic BWP adaptation or switching is set to a best-M subband CQI feedback mode, M may also be set to be different for each BWP.

Subband Formation to Handle Dynamic BWP Adaptation Or Switching (Option 1) Nested structure In BWP adaptation or switching, BWPs before and after the BWP adaptation or switching are configured with subband sizes and subband configurations in a nested structure. Alternatively, the subband sizes may not vary. This method is advantageous in that a measurement in an overlapped subband may be reused.

(Option 1-1) For example, one or more subbands or a wideband of a small BWP may be a subband of a large BWP. The subband size of the large BWP may be a multiple of the subband size of the small BWP. Because a subband of the large BWP accurately, that is, fully includes a subband of the small BWP, the following CSI feedback modes may be used to reduce feedback overhead, instead of feeding back all of wideband/subband CSI for each of the small and large BWPs.

1. Subband CQI feedback for small BWP+subband/wideband CQI feedback for large BWP: when a subband of the large BWP includes the wideband of the small BWP, there is no need for transmitting a feedback for the wideband of the small BWP, thereby reducing feedback overhead.

2. Subband/wideband CQI feedback only for large BWP: because no subband CQI feedback for the small BWP is transmitted, feedback overhead may be reduced.

Figure 11:
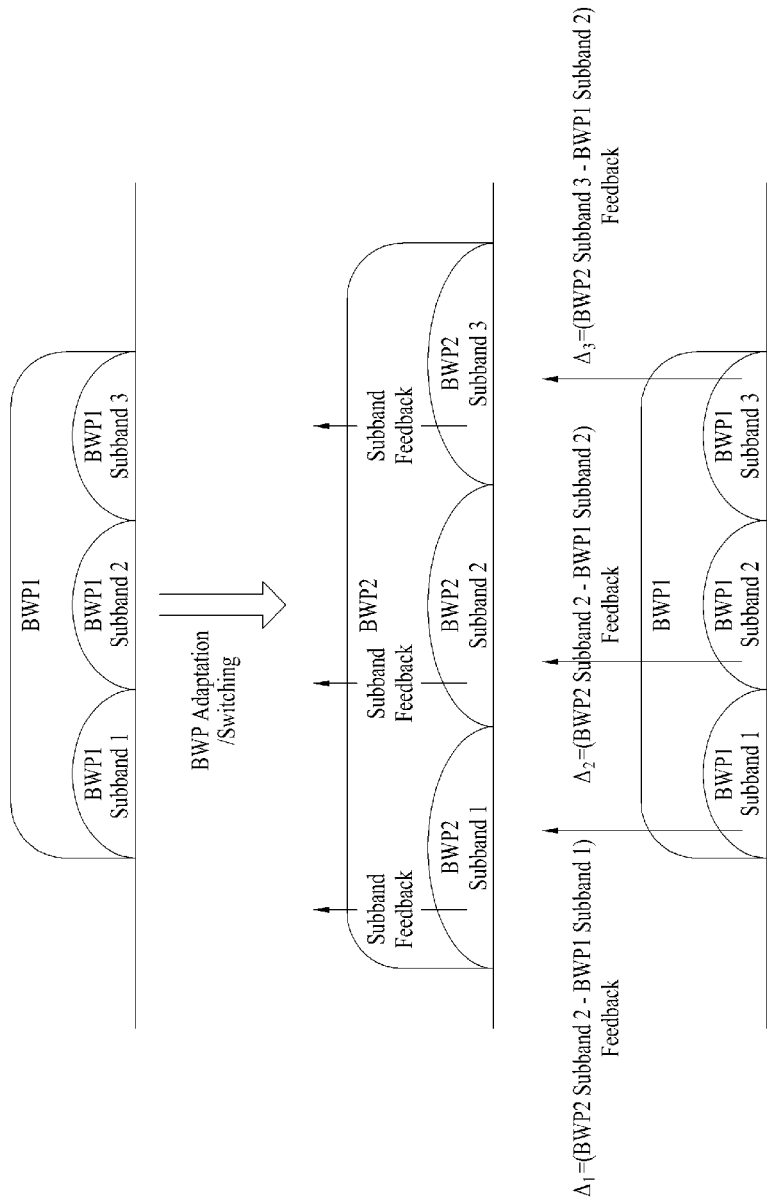
FIG. 11 is a diagram illustrating channel state reporting after BWP adaptation or switching.

(Option 1-3) Differential subband CQI feedback: only a difference Δ from a subband CQI for the large BWP may be fed back as a subband CQI for the small BWP, thereby reducing overhead. FIG. 11 illustrates a situation in which, when BWP adaptation or switching from BWP1 (a small BWP) to BWP2 (a large BWP) occurs, feedbacks for subband 2 and subband 3 of BWP2 are differences from feedbacks for subband 1 and subband 2 of BWP 1 perfectly included in (or overlapped with) subband 2 of BWP 2 and subband 3 of BWP1 perfectly included in (or overlapped with) subband 3 of BWP2.

Figure 12:
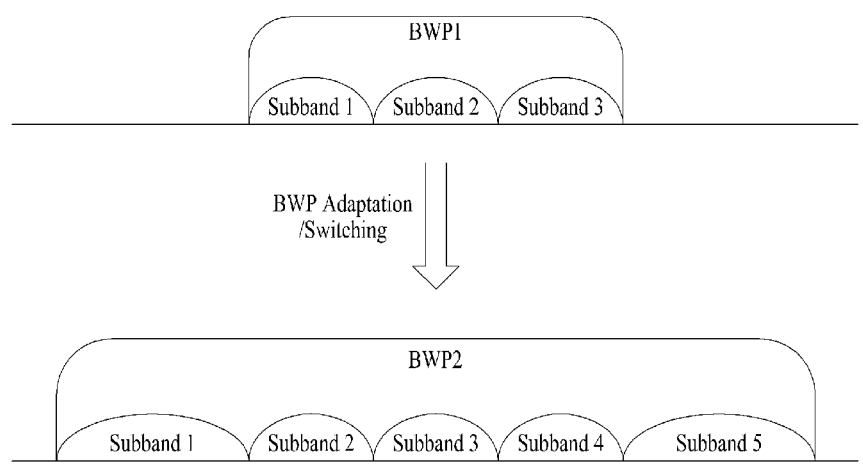
FIG. 12 is a diagram illustrating channel state reporting after BWP adaptation or switching.

(Option 2) In BWP adaptation, an area overlapped between small and large BWPs has the subband size of the small BWP, whereas the remaining area has a separately configured subband size. Herein, the subband size may be different for each BWP. For example, in FIG. 12, each of subbands (e.g., subband 1 and subband 5) in an area of BWP2, which is not overlapped with BWP1, may be of a larger size than a subband of BWP1, thereby reducing subband CQI/PMI feedback overhead.

(Option 3) Differential wideband CQI feedback

Figure 13:
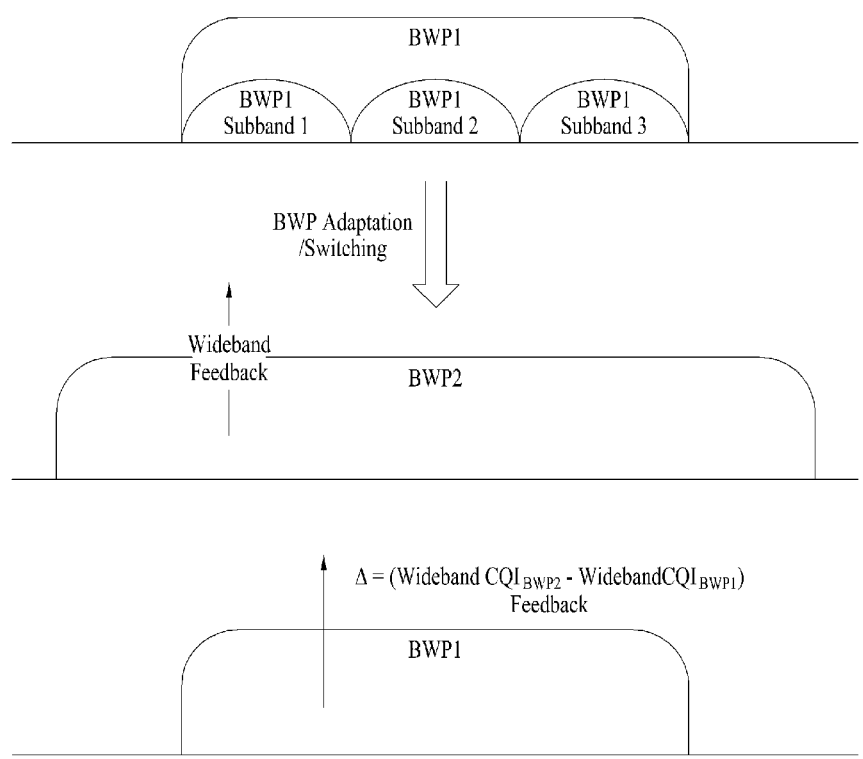
FIG. 13 is a diagram illustrating channel state reporting after BWP adaptation or switching.

Only a difference Δ from a wideband CQI for a large BWP is fed back as a wideband CQI for a small BWP, thereby reducing feedback overhead. Basically, this operation may be applied when the small BWP is fully or partially included in the large BWP, and may be extended to a case in which there is no overlap area before and after BWP adaptation. FIG. 13 illustrates a case in which the difference between a wideband CQI for a small BWP (BWP1) and a wideband CQI for a large BWP (BWP2) is reported, instead of the wideband CQI for the small BWP (BWP1).

(Option 4) Subband size with RBG-size granularity

The BS may configure subbands in a BWP such that a multiple of a subband size is an RBG size. This may mean that the subband size may be set to k multiples of the RBG size, and k may be signaled by higher-layer signaling. This subband size may be associated with a PRB bundling option. That is, when a PRB bundling size is equal to the RBG size, the subband size may also be assumed to be equal. Otherwise, the subband size may be calculated by applying k, and which size to be assumed may be indicated by a CSI configuration or aperiodic CSI-triggering DCI. On the assumption that BWP adaptation or switching is performed in units of the RBG size of a current active BWP, subband configurations before and after BWP adaptation or switching may naturally overlap.

Herein, the following modes for feeding back a subband CQI may be considered.

(Option 4-1) Subband CQIs are averaged in units of an RBG size and fed back.

(Option 4-2) A subband CQI corresponding to best-1 is selected within an RBG size, and fed back on an RBG size basis.

Dynamic Subband Size Determination in Case of BWP Adaptation Or Switching

Each time BWP adaptation or switching dynamically occurs, a subband size may be changed. Then, the changed subband size may have to be indicated to a UE.

(Option 1) The UE may assume a subband size for a new BWP for BWP adaptation or switching by comparing feedback subband CQI values of an active BWP with a specific threshold T. The threshold T may be predefined or RRC-configured for the UE by the BS. The feedback subband CQIs may be for total subbands or best-M subbands.

For example, when each of differences between the feedback total or best-M subband CQI values is smaller than T, the UE may assume that the BWP is not frequency-selective at a corresponding time. Further, the UE may assume that the subband size may vary according to a subband size parameter N during BWP adaptation or switching, where N may be predefined or RRC-configured. N may be represented in PRBs, and may be a scaling factor applied to a subband size.

More generally, multiple values of T and N may be predefined or RRC-configured. In a more specific example, it is assumed that there are three thresholds T1, T2 and T3, the relationship that T1≤T2≤T3 is established, and subband size parameters N1, N2 and N3 are given.

(Case 1) When each of differences between the feedback total or best-M subband CQI values is smaller than T1, it may be considered that the BWP is not relatively frequency-selective. The UE may assume that the subband size parameter N1 is applied.

(Case 2) When all of the differences between the feedback total or best-M subband CQI values are smaller than T2 with one or more of the differences being larger than T1, it may be considered that the BWP is more frequency-selective than in (Case 1). The UE may assume that the subband size parameter N2 is applied.

(Case 3) When all of the differences between the feedback total or best-M subband CQI values are smaller than T3 with one or more of the differences being larger than T1 and/or T2, it may be considered that the BWP is more frequency-selective than in (Case 1) and (Case 2). The UE may assume that the subband size parameter N3 is applied.

(Case 4) When all of the differences between the feedback total or best-M subband CQI values are larger than T3, it may be considered that the BWP is more frequency-selective than in (Case 1), (Case 2), and (Case 3). The UE may assume that the subband size parameter N3 is applied. Alternatively, an additional parameter N4 may be introduced and applied.

The relationship that N1≥N2≥N3(≥N4) may be established among the subband parameters.

To prevent a mismatch between the BS and the UE regarding a subband size changing time, the UE and the BS may assume that when an active BWP is changed, that is, BWP adaptation or switching occurs, a subband size is changed. Further, to increase reliability regarding the mismatch of a subband size changing time, the UE may transmit a feedback n times repeatedly to the BS. Herein, n may be predefined or separately configured.

While the present proposal has been described in the context of BWP adaptation or switching which changes an active BWP, the proposal may also be extended to a case in which an active BWP is not changed, that is, BWP adaptation or switching does not occur. Herein, the UE may have to prevent the mismatch regarding a time of changing a subband size between the BS and the UE by receiving an explicit indication related to a subband size change from the BS or the like. The explicit indication may be 1 bit and may be transmitted in DCI or the like.

(Option 2) The UE may determine a subband size for a BWP and indicate the determined subband size to the BS. However, this operation may impose a limit on BS scheduling.

Specifically, when a subband size needs to be changed dynamically due to BWP adaptation or switching, the UE may determine a subband size parameter and indicate the subband size parameter to the BS without the need for receiving a subband size from the BS. The UE may transmit the subband size parameter (1) in UCI, (2) on a control channel, or (3) on a data channel (1) The subband size parameter may be represented in PRBs, and (2) the subband size parameter may be a scaling factor applied to an existing subband size.

The BS may transmit a confirmation for the received subband size parameter to the UE. The UE may assume that the existing subband size is maintained until before receiving the confirmation from the BS, and the subband size is changed to a subband size to which the subband size parameter is applied after receiving the confirmation. This confirmation may be indicated by 1 bit in DCI.

For example, when the UE transmits the subband size parameter in UCI/control channel/data channel, the UE may expect to receive a confirmation for the transmitted subband size parameter in the form of a 1-bit ACK/NACK from the BS. Upon receipt of an ACK, the UE may assume that the existing subband size has been changed to the subband size to which the subband size parameter transmitted to the BS has been applied. Upon receipt of a NACK, the UE may assume that the existing subband size used for measurement is maintained unchanged. When the UE fails to receive the ACK/NACK for a predefined time, the UE may retransmit the subband size parameter to the BS.

(Option 3) Even though the UE transmits a subband size parameter to the BS as in Option 1 or Option 2, the UE may receive an explicit subband size from the BS. This may be a dynamic indication or configuration from the BS. The UE may assume that the subband size of a corresponding BWP has been changed according to the explicit subband size indicated by the BS.

Figure 14:
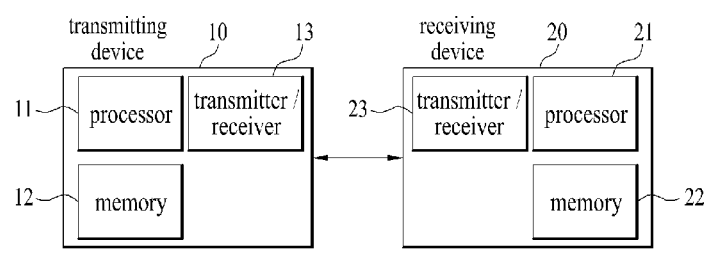
FIG. 14 is a block diagram illustrating devices configured to implement embodiment(s) of the present disclosure.

FIG. 14 is a block diagram of a transmitting device 10 and a receiving device 20 configured to implement exemplary embodiments of the present disclosure. The transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on UL and as the receiving device 20 on DL. In embodiments of the present disclosure, an eNB serves as the receiving device 20 on UL and as the transmission device 10 on DL.

The transmitting device and/or the receiving device may be configured as a combination of one or more embodiments of the present disclosure.

According to another embodiment of the present disclosure as one of these combinations of proposals, a UE for performing channel measurement in a wireless communication system may include a transceiver and a processor configured to control the transceiver. The processor may be configured to receive a configuration related to channel state reporting for a plurality of BWPs for which the UE performs BWP adaptation or switching, and report CSI for the plurality of BWPs according to the received configuration. The CSI for the plurality of BWPs may include CSI for an inactive BWP. The plurality of BWPs may include a first BWP and a second BWP at least partially overlapped with the first BWP and smaller than the first BWP, a subband size of the first BWP may be a multiple of a subband size of the second BWP, and a subband of the first BWP may fully include a subband of the second BWP.

Further, CSI for the first BWP may include CSI for the subband of the first BWP, except for a part overlapped with the second BWP.

Additionally, the CSI for the first BWP may include CSI for the subband of the first BWP overlapped with the second BWP.

Additionally, the CSI for the first BWP overlapped with the second BWP may include a difference between the CSI for the subband of the first BWP, overlapped with the subband of the second BWP and CSI for the subband of the second BWP.

Additionally, each of the subband sizes may be a multiple of a resource block group size.

Further, CSI processes may be configured individually for the first BWP and the second BWP, and a measurement may be performed for the inactive BWP in a measurement gap of a CSI process for an active BWP between the first BWP and the second BWP.

Further, an integrated CSI process may be configured for the first BWP and the second BWP, and a measurement may be performed for the inactive BWP in a measurement gap of the CSI process.

Further, a CSI reporting periodicity for an active BWP between the first BWP and the second BWP may be shorter than a CSI reporting periodicity for the inactive BWP.

As described above, the detailed description of the preferred examples of the present disclosure has been given to enable those skilled in the art to implement and practice the disclosure. Although the disclosure has been described with reference to exemplary embodiments, those skilled in the art will appreciate that various modifications and variations can be made in the present disclosure without departing from the spirit or scope of the disclosure described in the appended claims. Accordingly, the disclosure should not be limited to the specific examples described herein, but should be accorded the broadest scope consistent with the principles and novel features disclosed herein.

INDUSTRIAL APPLICABILITY

The present disclosure may be used for a wireless communication apparatus such as a UE, a relay, and an eNB.

The invention claimed is:
1. A method of reporting a channel state by a user equipment (UE) in a wireless communication system, the method comprising:
receiving a configuration related to channel state information (CSI) for a plurality of bandwidth parts (BWPs) including a first BWP and a second BWP,
wherein the configuration includes information related to at least one threshold and at least one sub-band size parameter, and
wherein each of the plurality of BWPs includes a plurality of sub-bands;
obtaining a sub-band CSI for each of a plurality of first sub-bands of the first BWP;
comparing difference values of the sub-band CSIs to a corresponding threshold of the at least one threshold;
determining a sub-band size parameter, from among the at least one sub-band size parameter, based on a result of the comparison between each difference value of the sub-band CSIs and the corresponding threshold;
determining a size of second sub-bands of the second BWP based on the determined sub-band size parameter;
reporting CSIs for the first sub-bands of the first BWP;

switching an active BWP from the first BWP to the second BWP; and measuring CSI for the second BWP based on the second sub-bands of the second BWP having the determined size based on the sub-band size parameter, wherein the second BWP at least partially overlaps the first BWP and is smaller than the first BWP, wherein a size of the first sub-bands is a multiple of a size of the second sub-bands, and wherein the first sub-bands fully include the second sub-bands.

2. The method according to claim 1, wherein CSI for the first BWP includes CSI for the first sub-bands overlapped with the second sub-bands.

3. The method according to claim 2, wherein the CSI for the first BWP includes a difference between the CSI for the first sub-bands overlapping the second sub-bands and CSI for the second sub-bands.

4. The method according to claim 1, wherein CSI for the first BWP includes CSI for the first sub-bands, except for a part overlapping with the second sub-bands.

5. The method according to claim 1, wherein CSI for the first BWP includes CSI for the second sub-bands overlapping the first sub-bands.

6. A user equipment (UE) for performing channel measurement in a wireless communication system, the UE comprising:
 a transceiver; and
 a processor configured to control the transceiver,
 wherein the processor is configured to:
 receive a configuration related to channel state reporting information (CSI) for a plurality of bandwidth parts (BWPs) including a first BWP and a second BWP,
 wherein the configuration includes information related to at least one threshold and at least one sub-band size parameter,
 wherein each of the plurality of BWPs includes a plurality of sub-bands;
 obtain a sub-band CSI for each of a plurality of first sub-bands of the first BWP;
 compare difference values of the sub-band CSIs to a corresponding threshold of the at least one threshold;
 determine a sub-band size parameter, from among the at least one sub-band size parameter, based on a result of the comparison between each difference value of the sub-band CSIs and the corresponding threshold;
 determine a size of second sub-bands of the second BWP based on the determined sub-band size parameter, and
 report CSIs for the first sub-bands of the first BWP;
 switch an active BWP from the first BWP to the second BWP,
 wherein the second BWP at least partially overlaps the first BWP and is smaller than the first BWP, wherein a size of the first sub-bands is a multiple of a size of the second sub-bands, and wherein the first sub-bands fully include the second sub-bands.

7. The UE according to claim 6, wherein CSI for the first BWP includes CSI for the first sub-bands overlapped with the second sub-bands.

8. The UE according to claim 7, wherein the CSI for the first BWP includes a difference between the CSI for the first sub-bands overlapping the second sub-bands and CSI for the second sub-bands.

9. The UE according to claim 6, wherein CSI for the first BWP includes CSI for the first sub-bands, except for a part overlapping the second sub-bands.

10. The UE according to claim 6, wherein CSI for the first BWP includes CSI for the second sub-bands overlapping the first sub-bands.

* * * * *